United States Patent [19]
Larson

[11] Patent Number: 5,394,831
[45] Date of Patent: Mar. 7, 1995

[54] RESISTANCE MILK FLOW SENSOR

[75] Inventor: Larry G. Larson, Waunakee, Wis.

[73] Assignee: Babson Bros. Co., Naperville, Ill.

[21] Appl. No.: 985,038

[22] Filed: Dec. 3, 1992

[51] Int. Cl.$^6$ ............................................. A01J 3/00
[52] U.S. Cl. .................................................. 119/14.18
[58] Field of Search ............... 119/14.01, 14.18, 14.15, 119/14.14; 73/861.08, 861.09, 861.04, 861.05; 324/454

[56] References Cited

U.S. PATENT DOCUMENTS

| | | |
|---|---|---|
| 3,826,252 | 4/1973 | Needham et al. |
| 4,064,838 | 12/1977 | Mukarovsky et al. |
| 4,344,385 | 8/1982 | Swanson et al. |
| 5,022,274 | 6/1991 | Klinzing et al. ............... 73/861.08 X |

FOREIGN PATENT DOCUMENTS

| | | | |
|---|---|---|---|
| 459733 | 3/1975 | U.S.S.R. | 73/861.09 |
| 838357 | 6/1981 | U.S.S.R. | 73/861.08 |

Primary Examiner—Gene Mancene
Assistant Examiner—Thomas Price
Attorney, Agent, or Firm—Wood, Phillips, VanSanten, Hoffman & Ertel

[57] ABSTRACT

A non-intrusive milk flow sensor includes first and second cylindrical nipples of a conductive material. Each of the first and second cylindrical nipples has an inner diameter. A molded rubber body has a passage therethrough joining the first and second nipples. The body fixes the first cylindrical nipple inline with the second cylindrical nipple and is bonded with the nipples. The body has an inner diameter defined by the passage equal to the inner diameter of the first and second cylindrical nipples. The molded rubber body insulates the first cylindrical nipple from the second cylindrical nipple. A first electrical lead is connected to the first cylindrical nipple. A second electrical lead is connected to the second cylindrical nipple.

16 Claims, 1 Drawing Sheet

RESISTANCE MILK FLOW SENSOR

FIELD OF THE INVENTION

This invention relates to milk flow sensors and more particularly to resistance milk flow sensors.

BACKGROUND ART

Prior art resistance milk flow sensors measure resistance between two electrical conductors separated by an insulator and located in a milk line. Milk flowing across the conductors decreases the resistance between the conductors and a circuit connected to the conductors measures the resistance to determine milk flow.

Prior resistance flow sensors include first and second sections of electrically conductive tubing connected together by a cylindrical insulator such as plastic. First and second leads connect the first and second sections of tubing to a circuit which measures electrical resistance. The first section of tubing, the insulator, and the second section of tubing are connected consecutively in a milking line.

These resistance milk flow sensors have crevices at junctions between the first and second sections of tubing and the insulator. Milk collects in the crevices during use and the crevices are difficult to clean. Some of the prior resistance flow sensors require labor-intensive disassembly for proper cleaning.

Other prior resistance flow sensors include first and second probes which project inside the milk flow lines. The probes are connected to a circuit which measures resistance therebetween.

This type of intrusive milk flow sensor also has the drawback that milk collects around the projecting probes.

SUMMARY OF THE INVENTION

A non-intrusive milk flow sensor includes first and second cylindrical nipples of a conductive material. Each of the first and second cylindrical nipples has an inner diameter. A molded rubber body has a passage therethrough joining the first and second nipples. The body fixes the first cylindrical nipple inline with the second cylindrical nipple. The body has an inner diameter defined by the passage equal to the inner diameter of the first and second cylindrical nipples. The molded rubber body insulates the first cylindrical nipple from the second cylindrical nipple. A first electrical lead is connected to the first cylindrical nipple. A second electrical lead is connected to the second cylindrical nipple.

It is a feature of the invention that the first and second electrical leads are coated with silicone.

In a further feature of the invention, the first and second cylindrical nipples are of stainless steel.

In still a further feature of the invention, the first and second cylindrical nipples include a radially-extending annular flange at facing ends.

Other objects, features and advantages will be readily apparent.

DETAILED DESCRIPTION OF THE PREFERRED EMBODIMENT

Figure 1:
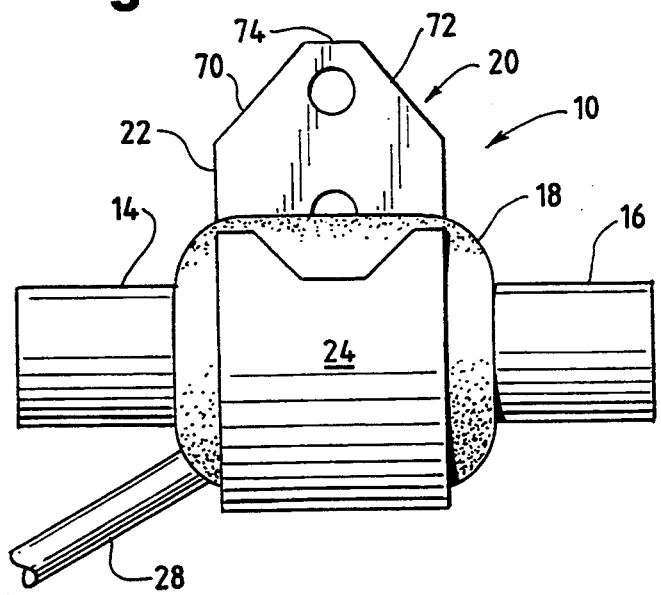
FIG. 1 is a plan view of a resistance milk flow sensor.

In FIG. 1, a milk flow sensor 10 includes first and second cylindrical nipples 14, 16 and a tubular body 18. The milk flow sensor 10 can be connected to milk lines to receive milk flowing from a teat cluster attached to teats of a milking cow.

The milk flow sensor 10 also includes a bracket 20 for mounting the milk flow sensor 10 to a support by a bolt (both not shown). The bracket 20 includes a planar section 22 which is mounted on the support and an arcuate section 24 which supports and is formed around the tubular body 18.

Figure 2:
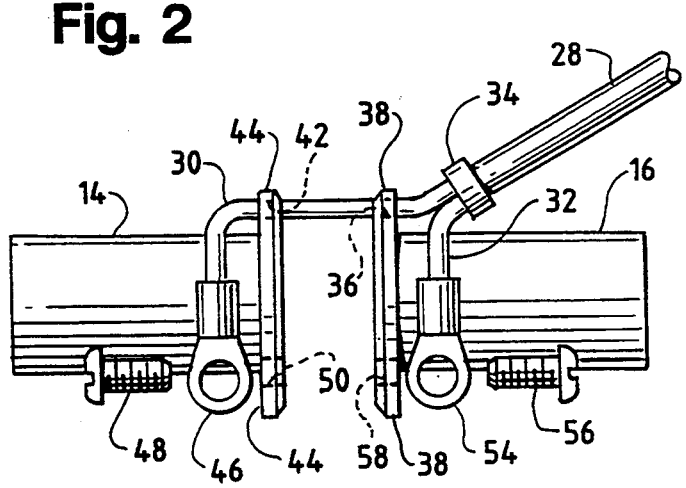
FIG. 2 is a plan view of a partially assembled resistance milk flow sensor.

FIG. 2 shows a partially assembled view of the milk flow sensor 10. An assembly fixture (not shown) holds the first and second nipples 14,16 in line and maintains a gap between the first and second nipples 14, 16 during assembly. A heat resistant and insulating sleeve 28 houses first and second electrical leads 30, 32. A hose clamp 34 is crimped flush with an outside surface of the sleeve 28. The clamp 34 prevents damage to the sleeve 28 during assembly and holds the first and second leads 30,32 together.

The first lead 30 is initially threaded through a hole 36 in a radially projecting annular flange 38 of the second nipple 16. The first lead 30 is then threaded through a hole 42 into a radially projecting annular flange 44 on the first nipple 14. A ring terminal 46 is crimped to an end of the first lead 30. Finally, a screw 48 inserted through the ring terminal 46 and into a threaded hole 50 fastens the first lead 30 to the annular flange 44 on the first cylindrical nipple 14.

A ring terminal 54 is crimped to an end of the second lead 32. A screw 56 inserted through the ring terminal 54 and into a threaded hole 58 fastens the second lead 32 to the annular flange 38 on the second cylindrical nipple 16.

Both the first and second leads 30, 32 are coated with a heat resistant and insulating material.

After fastening the first and second leads 30, 32 to the first and second nipples 14, 16, the tubular body 18 is formed.

Figure 3:
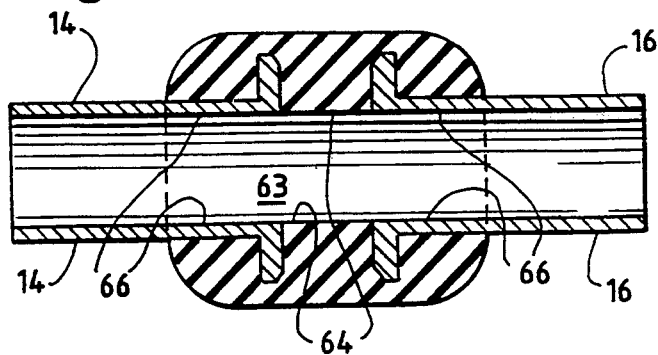
FIG. 3 is a cross-sectional view of a tubular body and first and second nipples of the resistance milk flow sensor.

In FIG. 3, a cross-sectional view of the tubular body 18 and the inline first and second nipples 14,16 is shown. For illustration purposes, the first and second leads 30, 32, the ring terminals 46, 54, the sleeve 28, the holes 36, 42, 44, 58 and the screws 48, 56 are not shown. It is to be understood that these parts would be located inside the tubular body 18.

A passage 63 defines an inner diameter 64 of the tubular body 18 and is formed flush with inner diameters 66 of the first and second nipples 14,16 to prevent milk buildup which causes cleaning problems.

A circuit (not shown) connected to the first and second leads 30,32 measures resistance between the first and second nipples 14,16. As milk flows across the first and second nipples 14,16, the resistance decreases. The circuit detects the decrease to measure milk flow.

The tubular body 18 can be of molded rubber, for example neoprene. The nipples 14, 16 are constructed from a hygienically innocuous material such as stainless steel, platinum, carbon, etc. If the nipples are of stainless steel, the body is preferably formed of molded rubber since plastic will not bond to stainless steel. A bonding agent adheres the molded rubber to the stainless steel nipples. CHEMLOCK ™ manufactured by Lord Chemical Co. in Erie, Pa. is a suitable bonding agent.

The insulating and heat resistant coating on the leads 30,32 and the sleeve 28 are preferably of silicone which can withstand heat of molten rubber applied during assembly. SILFLEX TM manufactured by Olflex Cable and Wire Co. in Fairfield, Conn. can be used for the sleeve and the coating.

The annular flanges 38,44 prevent the nipples 14,16 from being removed from the body 18 after the body is formed and provide a mounting surface for the screws 48,56.

The ring terminals 46, 54 and screws 48, 56 are used instead of soldering to provide a stronger mechanical connection between the first and second leads 30,32 and the first and second nipples 14,16. For example, the first and second leads 30,32 are typically of copper, while the nipples 14,16 are of stainless steel. Because of different materials used for the nipples and leads, soldering provides insufficient mechanical strength to reliably withstand stress encountered when the tubular body is molded.

For optimum operation, the sensor is mounted at 45 degrees. First and second bevels 70, 72 inclined 45 degrees with respect to a horizontal edge 74 on the bracket 20 provide a convenient reference for mounting. Depending upon the direction of flow, either the first or second bevel 70, 72 is leveled to obtain a desired orientation for the sensor 10.

As can be appreciated, by forming the body with the passage defining the inner diameter equal to the inner diameters of the nipples, crevices which cause milk buildup are avoided.

I claim:

1. In a milk flow sensor including
   first and second cylindrical nipples of a conductive material each having an inner diameter,
   a body connecting the first cylindrical nipple with the second cylindrical nipple and insulating said first cylindrical nipple from said second cylindrical nipple,
   a first electrical lead connected to said first cylindrical nipple, and
   a second electrical lead connected to said second cylindrical nipple, an improved milk flow sensor wherein:
   said body is molded and has a passage therethrough joining the first and second nipples, said passage defining an inner diameter equal to the inner diameter of the first and second cylindrical nipples, said body being bonded to and fixing said first cylindrical nipple inline with said second cylindrical nipple.

2. The improved milk flow sensor if claim 1 wherein said first and second electrical leads are coated with silicone.

3. The improved milk flow sensor of claim 1 wherein said first and second cylindrical nipples are of stainless steel and said molded body is of rubber.

4. The improved milk flow sensor of claim 1 wherein said first and second cylindrical nipples include a radially extending annular flange at facing ends.

5. The improved milk flow sensor of claim 4 wherein said first and second electrical leads each include a ring terminal crimped at an end thereof.

6. The improved milk flow sensor of claim 4 wherein said first and second annular flanges each have a first hole and a threaded hole.

7. The improved milk flow sensor of claim 6 wherein said first lead extends through the first hole on the second nipple and the first hole on the first nipple and said ring terminal on the end of said first lead is fastened to said threaded hole on said first nipple with a screw.

8. The improved milk flow sensor of claim 1 further including a bracket having a planar section and an annular section formed around the body, said planar section including a bevel providing a reference surface for mounting said milk flow sensor in a desired orientation.

9. A non-intrusive milk flow sensor including:
   first and second cylindrical nipples of a conductive material and each having an inner diameter;
   a molded body having a passage therethrough, bonded to and joining the first and second nipples, said body fixing the first cylindrical nipple inline with the second cylindrical nipple and having an inner diameter defined by said passage equal to said inner diameter of said first and second cylindrical nipples, said molded body insulating said first cylindrical nipple from said second cylindrical nipple;
   a first electrical lead connected to said first cylindrical nipple; and
   a second electrical lead connected to said second cylindrical nipple.

10. The milk flow sensor of claim 9 wherein said leads are coated with silicone.

11. The milk flow sensor of claim 9 wherein said first cylindrical nipple is of stainless steel and said body is molded rubber.

12. The milk flow sensor of claim 9 wherein said first cylindrical nipple includes a radially extending annular flange connected to said first lead by a screw and a ring terminal.

13. A method of making a milk flow sensor comprising the steps of:
   a) providing first and second cylindrical nipples each having an inner diameter;
   b) mounting the first and second cylindrical nipples on an assembly fixture; and
   c) forming a body extending around and bonded to the first and second nipples with a passage defining an inner diameter equal to the inner diameter of the first and second nipples.

14. The method of claim 13 further including the steps of:
   d) providing annular flanges on facing ends of the first and second nipples;
   e) forming a first hole and a threaded hole in each flange;
   f) connecting a first electrical lead through said first hole on said first flange and through said first hole on said second flange to said threaded hole on said second flange; and
   g) connecting a second electrical lead to said threaded hole on said first flange.

15. The method of claim 14 wherein steps a), b), d), e), f), g) are performed before step c).

16. The method of claim 13 further including the step
   h) coating said first and second electrical leads with silicone.

* * * * *